C. G. TIEFEL & A. C. LA MAY.
CHECK WRITER.
APPLICATION FILED AUG. 23, 1915.

1,293,986.

Patented Feb. 11, 1919.
5 SHEETS—SHEET 5.

UNITED STATES PATENT OFFICE.

CHARLES G. TIEFEL AND ARTHUR C. LA MAY, OF ROCHESTER, NEW YORK, ASSIGNORS, BY MESNE ASSIGNMENTS, TO TODD PROTECTOGRAPH COMPANY, OF ROCHESTER, NEW YORK, A CORPORATION OF NEW YORK.

CHECK-WRITER.

1,293,986.          Specification of Letters Patent.      Patented Feb. 11, 1919.

Application filed August 23, 1915. Serial No. 46,887.

*To all whom it may concern:*

Be it known that we, CHARLES G. TIEFEL and ARTHUR C. LA MAY, both of Rochester, in the county of Monroe and State of New York, have invented certain new and useful Improvements in Check-Writers; and we do hereby declare the following to be a full, clear, and exact description of the same, such as will enable any person skilled in the art to which the invention appertains to make and use the same.

This invention relates to printing apparatus of the kind known as check protectors, or check writers, and more particularly, to that kind of check protecting machines which is provided with printing characters adapted in coöperation with a platen to print the value upon the check and at the same time rupture the paper so that the latter may absorb the ink applied by the printing characters.

It is of prime importance in such machines that the type be kept plentifully supplied with ink so that the paper will be thoroughly marked. Machines of this type, however, are frequently subjected to usage of an intermittent nature by inexperienced operators, and without any regular attention, so that the supply of ink carried by the inking rolls is often allowed to be exhausted before it occurs to the operator to supply more ink, and checks printed by the machine in this condition are imperfectly protected.

It is therefore one object of the invention to provide a machine of this type having a fountain inking mechanism capable of keeping the printing characters properly supplied with ink sufficient for long periods of use, so that impressions taken from the machine will always be thoroughly inked, and thus afford the best protection.

Another object of the invention is to provide a machine of this type with a fountain inking mechanism of an automatic and self-contained character, adapted by the operation of the machine itself to supply ink from a reservoir to the inking rolls, in predetermined quantities proportional to the extent of use of the machine.

It is another object of this invention to provide a machine of this kind with a fountain inking mechanism by which ink is supplied from the reservoir to the surface of the rolls in precisely controlled quantities by a positive, force-feed device, thus not only insuring a sufficient supply, but likewise preventing an over supply of ink, which would smear the work and destroy the clearness of impression so important in this type of machine.

A further object of the invention is the provision of a fountain inking mechanism the operation of which will be uniformly successful regardless of the position in which the machine is placed, and which will have no tendency to leak in any position of the apparatus.

These and other objects and advantages will more fully appear from the description of the present embodiment of the invention illustrated in the accompanying drawings in which:—

The construction and operation of the printing apparatus in the present embodiment of the invention is disclosed, as to part, in Letters Patent of the United States No. 1,138,330, granted jointly to L. M. Todd and C. G. Tiefel May 4, 1915, for check writers, and in part in the copending joint application of L. M. Todd, C. G. Tiefel and A. C. La May, Ser. No. 40,657, filed July 19, 1915, for check writers. The essential features of this apparatus will now be described.

Figure 1:
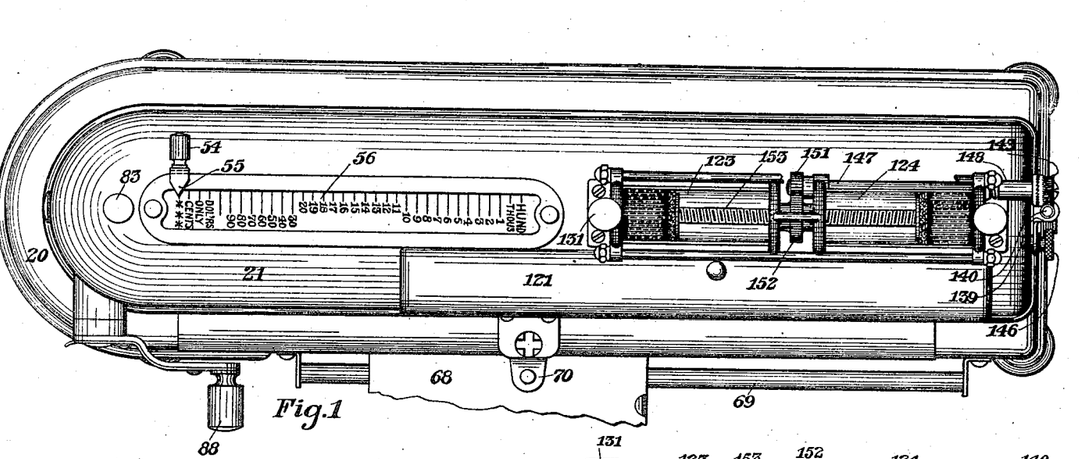
Figure 1 is a top plan view of the machine.
Figure 2:
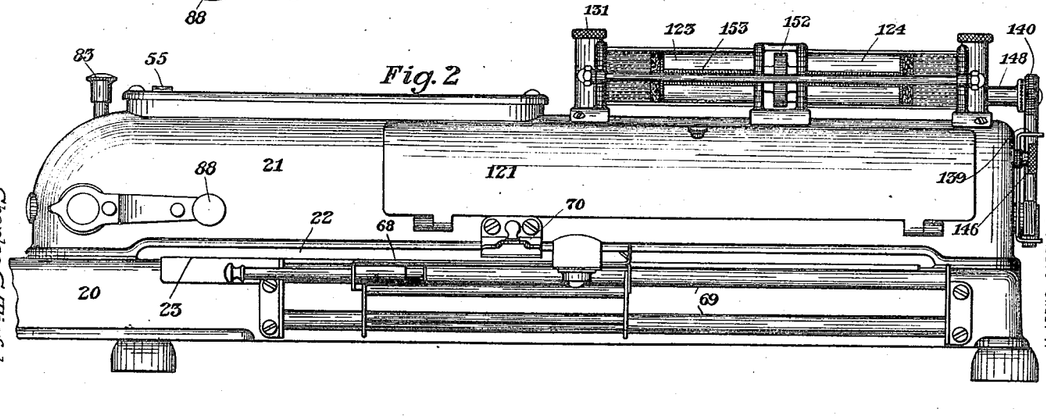
Fig. 2 is an elevation of the front side of the machine.
Figure 9:
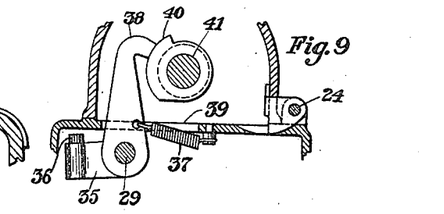
Fig. 9 is a sectional elevation showing the means for actuating the platen.

Referring to the drawings, the numeral 20 is used to designate the lower or base portion of a casing for the machine, upon which is supported an upper casing portion 21. These parts are separated through most of their length by a work receiving slot 22, above a printing bed 23 supported on the base portion 20 of the casing. The two parts of the casing are shown in operative position in Figs. 1 and 2, but the upper portion of the casing is attached to the lower portion by hinge devices 24 (Figs. 3 and 9), to allow the upper portion to be swung back to afford access to the interior parts, as shown in Fig. 3, and the parts may be securely fastened together when in operative position by any convenient means, such as the screw 25 shown in Fig. 4.

The printing bed 23 is provided with an opening 26 through which is adapted to be projected a platen wheel 27 rotatably carried in the forked end of a yoke member 28 which is adjustably fixed on a shaft 29 by means of thrust and take-up screws 30 and 31 coöperating with an arm 32 fixed to the said shaft. Shaft 29 is journaled in lugs 33 depending from the printing bed, to allow a rocking motion to be imparted thereto, and near its outer end there is fixed to the shaft a sleeve 34 provided with an arm 35 carrying a stop member 36 adapted to contact with the under side of the printing bed to limit the downward motion of the platen wheel 27, so that its top is normally level with the printing bed. The platen is normally retained in this lower, or inactive position, by means of a spring 37 (Fig. 9) fixed to the casing and to an arm 38 on the sleeve 34 extending upwardly through an opening 39 provided in the printing bed. The arm 38, which serves as a means for rocking shaft 29 and raising the platen wheel for engagement with the type forms, is adapted to contact at its upper end with the surface of a cam 40 fixed on a shaft 41 extending longitudinally of the upper portion of the casing and journaled at its ends therein. As the shaft 41 is revolved, the cam 40, once in each revolution of the shaft, actuates the arm 38 and so raises the platen 27 into contact with a plurality of type forms on a carrier in the casing above, which will now be described.

Figure 3:
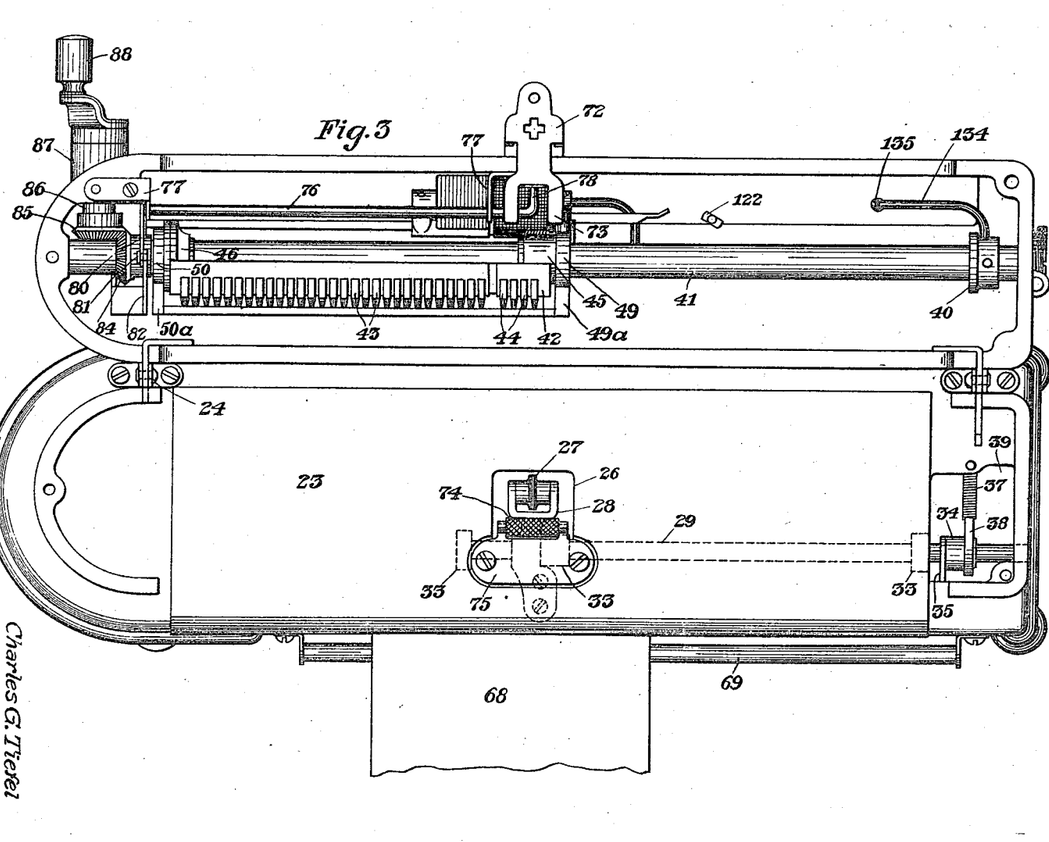
Fig. 3 is a plan view, showing the upper portion of the casing swung back to expose the interior parts.

Supported by the shaft 41 is a rotary and longitudinally slidable type carrier 42, having a semi-cylindrical surface provided with two groups of type forms indicated at 43 and 44 (Fig. 3). These forms are arranged circumferentially of the carrier and are spaced longitudinally thereof so that they may be brought, selectively and individually, into position for rolling contact with the platen wheel upon revolution of the carrier. The printing surfaces of the type and platen are provided with grooves, or serrations, adapted to intermesh during the printing contact so that as the paper is printed by the rolling contact of the type and platen the intermeshing serrations, engaging the paper between them, feed it positively forward, and shred it so that it may become saturated with the printing ink. Referring to Fig. 3 it will be seen that the type forms are arranged on the carrier with their rear ends in alinement, so that the cam 40 may allow the platen to be retracted at the instant that each type form leaves the platen, for the purpose of controlling the spacing feed of the paper at the end of each word. The carrier 42 is provided with ends 45 and 46 having a sliding bearing on the shaft 41, but the carrier is rotated by the rotation of the shaft by means of a key 46 (Fig. 7) engaging a keyway 47 in the shaft.

Figure 15:
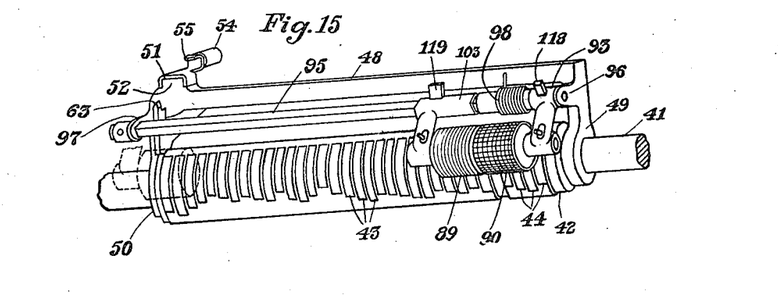
Fig. 15 is a perspective view of the type carrier, yoke and inking rolls, showing in full and dotted lines the extreme positions of the red inking roll.
Figure 16:
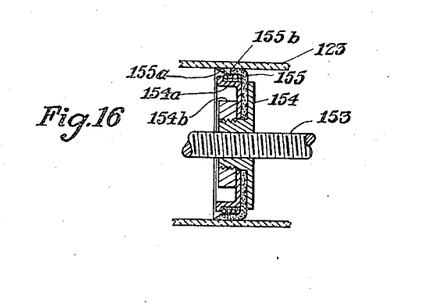
Fig. 16 is a sectional view of the plunger for the ink container.

The means for moving the type carrier longitudinally of its shaft comprises a yoke 48 (Figs. 5 and 15), having ends 49 and 50 slidably supported on shaft 41, and closely embracing the ends of the type carrier to move the latter whenever the yoke is moved. The means for moving the yoke comprises a plate 51 fixed to a lug 52 on the yoke and extending through an opening 53 in the upper part of the casing. The plate is provided with a convenient handle 54 and is turned horizontally to form a pointer 55 extending above a dial 56 supported by a plate 57 resting upon a wall 58 on the top of the casing. Plate 57 is provided with an elongated opening the edges of which are turned downwardly to form guides for a small roller 60 rotatably mounted on the yoke. By grasping the handle 54 the type carrier may be moved to select any one of the type forms for printing, the roller 60 serving to prevent rotation of the yoke when the type carrier is revolved.

Figure 6:
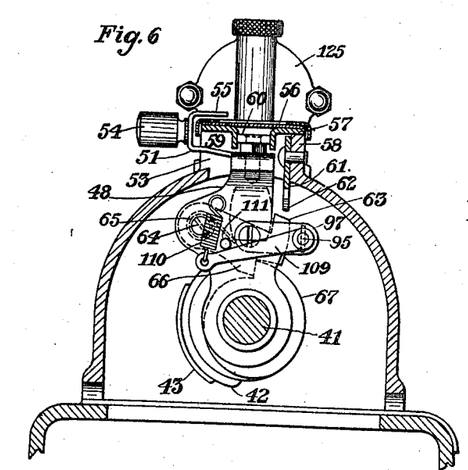
Fig. 6 is a sectional elevation on the line 6—6 of Fig. 5.

The means for centering the type forms in printing position so that the coöperating serrations of the printing surfaces will register with each other, and for locking the type forms in this position, comprises a rack 61 depending from the wall 58 of the casing and provided at its lower edge with a series of beveled teeth 62. A dog 63 having a beveled edge adapted to engage between the teeth of the rack, is pivoted to the yoke 48 at 64, and is normally urged downwardly out of engagement with the rack by means of a spring 65 (Fig. 6), so that a lug 66 on the dog engages the surface of a cam 67 formed on the end 46 of the type carrier. As the type forms are rotated toward the platen the dog is raised into engagement with the teeth of the rack and the beveled surfaces of the parts serve to move the type carrier to precisely center the selected type form for coöperation with the platen, the carrier being securely locked in centered position by the full engagement of the dog with the teeth. As the type form leaves the platen, the cam allows the dog to be retracted from engagement with the rack, and so releases the carrier for further selective movement.

A work supporting extension, or table, 68 is provided at the front of the machine, and is adapted to be adjusted longitudinally thereof on the guide rods 69, but as this device forms no part of the present invention further description thereof will be unnecessary. Attached to the upper portion of the casing and extending horizontally above the table is a bracket 70 to which is pivoted at 71 a plate 72 extending inwardly over the printing bed where the plate is provided with a pair of resilient spaced fingers 73 adapted to bear upon a roller 74 journaled on a plate 75 fastened on the printing bed. The fingers 73 bear resiliently upon the paper on either side of the line of printing and serve to guide it during the feeding movement, and to hold it in place on the printing bed. In order that the paper may be inserted in the machine and withdrawn therefrom, a means is provided for raising the pressure fingers 73 comprising a spindle 76 journaled at its ends in brackets 77 fixed on the casing, and having a hook 78 at its inner end adapted to engage with a leaf 79 on the plate 72. At its other end the spindle 76 is provided with a horizontally extending arm 80 to which is pivoted at 81 a plate 82. The latter member extends upwardly around the shaft 41 and is provided at its upper end with a plunger 83 extending through the casing. The resilience of the fingers 73 serves to elevate the plunger 83, but by depressing the latter the pressure fingers may be raised out of contact with the roller and the printing bed.

The means for rotating shaft 41 comprises a gear 84 (Fig. 3) fixed on the shaft and meshing with a gear 85 fixed on a stub shaft 86 journaled in the bearing 87 on the casing. The shaft extends to the outside of the casing where it is provided with an operating crank 88.

Figure 10:
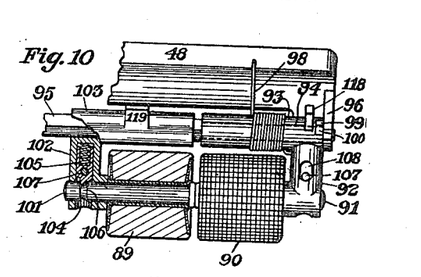
Fig. 10 is a perspective view of the inking rolls.

The means for applying ink to the type forms comprises, preferably, a pair of inking devices, or rolls, 89 and 90 (Fig. 10). As each of the groups of type forms prints in ink of a different color, a separate roll is employed for each group, the roll 89 being provided to apply ink of one color, as, for instance, red ink, to the group of forms 43, and the roll 90 being provided for applying ink of a different color, as, for instance, black, to the group of forms 44.

The roll 90, preferably is rotatably journaled on a spindle 91 fixed in an arm 92 on a sleeve 93 rotatably supported on a round bearing portion 94 of a rod 95 which is journaled at its ends in arms 96 and 97 extending from the yoke 48. The roll 90 is urged downwardly into the path of rotation of the type forms, so as to engage the latter, by a spring 98, but movement of the roll in this direction is limited so that the roll will smoothly roll upon and over the types, by means of a lug 99 on the arm 96, engaging in a slot 100 in the sleeve 93 the slot being of sufficient length to provide the necessary play for the ink roll.

The roll 89 is rotatably journaled on a spindle 101 supported by the arm 102 extending from a sleeve 103, slidably, but not rotatably, mounted on an angular portion of the rod 95. As each of the rolls 89 and 90 has its spindle removably fixed in the supporting arm in the same manner, a description of the construction used for one will be understood to apply to both. The supporting arm 102 is provided with a central bore 104, in which is a spring pressed plunger 105 adapted to engage with a recess 106 in the spindle. The plunger 105 is provided with a pin 107 extending through a slot 108 in the arm, by means of which the plunger may be retracted to allow the removal of the spindle and its roll, so that the latter may be cleaned, or replaced by a new one. The rod 95 extends beyond the supporting arm 97 and has fixed thereto an arm 109 (Fig. 6) which is pulled upwardly by a spring 110 fixed thereto and to the yoke, into engagement with a pin 111 on the yoke. As the sleeve 103 is mounted on the portion of the rod which is angular in cross section, the spring 110, by turning the rod 95, serves to hold the roll 89 in position to yieldingly engage the type forms during the rotation of the latter, as in the case of the roll 90.

The inking rolls are intended to be brought, individually, opposite the platen, in position to freshly ink the selected type form as the latter is rotated into printing contact with the paper, and it therefore becomes desirable to provide a construction for placing in such position the particular ink roll which is adapted to apply ink of the proper color to the selected type form. The roll 90 is of sufficient length to simultaneously engage each of the type forms of its group so that this roll has no motion relatively to the type carrier in the direction of its axis, as will be apparent from the construction described.

It is desirable to make the roll 89 of substantially the same length as the roll 90, that is, much shorter than the group of type forms 43 with which this roll coöperates, and to maintain it stationary at the printing point while its group of types is moved to bring various forms into coöperation with it. One purpose of this is to insure uniform wear upon the roll. If the roll were the same length as the group of types and had no movement relatively to them the latter would always contact with the same portions of the roll and, because of their considerable variations in length, would wear the roll unevenly. But when constructed to operate as herein shown, each portion of the roll contacts with various types and the wear is distributed. Another advantage of making the roll 89 shorter than its group of forms and of about the length of the roll 90 lies in the reduction of the area over which ink must be distributed so that the substantially equal quantities of ink fed to the rolls are distributed over equal areas.

Figure 4:
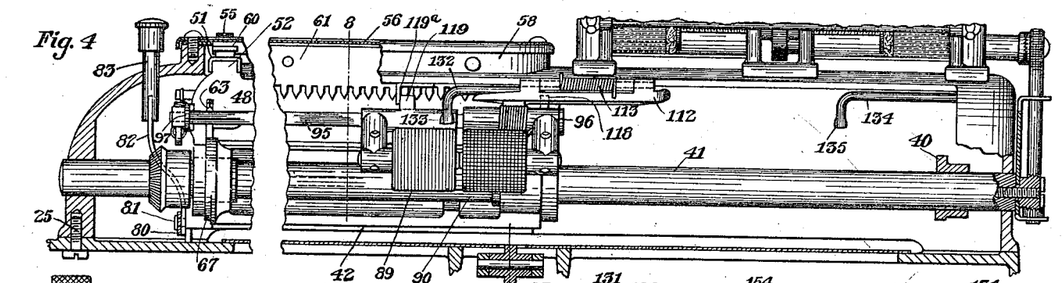
Fig. 4 is a central longitudinal section in elevation, showing the inking rolls in one position.

The means for shifting the roll 89 relatively to the type carrier so that it will be in position to ink whichever of its type forms is brought to printing position comprises a plate 112, pivoted to the top of the casing, which is urged inwardly by a spring 113 (Figs. 4 and 11), and the plate is provided at its lower edge with inwardly projecting cam surfaces 114 and 115, separated by an interval 116, the cam 114 having a high portion 117 adjacent this interval. The right end of plate 112 as seen in Fig. 4 is curved outwardly for camming engagement with a pin 118 carried by the sleeve 93, so that when the carrier is moved to bring roll 90 opposite the platen, the plate 112 is swung outwardly by the pin 118, but the cam surfaces have no tendency to restrain the movement of pin 118 so that the latter may be freely moved again out of engagement therewith. When the carrier is moved toward the right, as viewed in Fig. 4, to bring one of the red type forms to printing position, frictional engagement between the sleeve 103 and the rod 95 carries the roll 89 into active position opposite the platen. The movement of roll 89 in this direction carries a lug 119 fixed on the sleeve 103 into engagement with the cam surface 115, thereby swinging the plate 112 outwardly. The movement of the roll in this direction is limited by engagement of the lug 119 with the high portion 117 of the cam 114, and the lug having come opposite the interval 116 the plate 112 springs inwardly to engage the lug and hold it against movement in either direction so that the roll is retained in printing position as any one of the type forms of group 43 is selected for printing. When the carrier is moved toward the left, however, as viewed in Fig. 4, to bring one of the group of forms 44 to printing position, pin 118, as previously explained, moves the plate 112 outwardly and so releases the lug 119 so that the roll 89 is moved away from printing position and replaced by the roll 90. After this is accomplished, further movement of roll 89 toward the left is prevented by a stop 119ª fixed on the casing in the path of movement of the lug 119.

Figure 7:
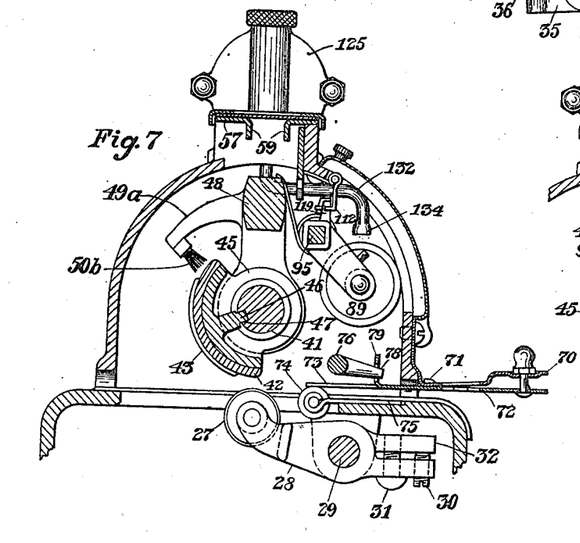
Fig. 7 is a sectional elevation on the line 7—7 of Fig. 5.
Figures 8, 11:
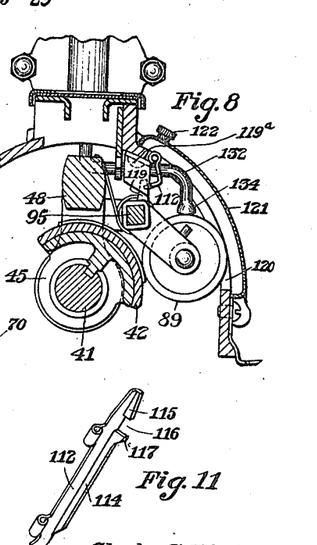
Fig. 8 is a sectional elevation of a portion of the machine on the line 8—8 of Fig. 4.
Fig. 11 is a perspective view of a retaining member for the inking rolls.

As will be seen by comparison of Figs. 7 and 8, whenever the inking rolls are engaged by the type forms they are swung upwardly, and the casing is provided at this point with an aperture 120 adapted to be closed by a cover 121 hinged at its lower edge to the casing and provided at its top with a latching device 122. This cover provides a convenient means for access to the inking mechanism. The construction of these inking rolls and of their associated devices form a part of the subject matter of the copending application of L. M. Todd and A. C. La May, Ser. No. 42,021, filed July 26, 1915, for check writers.

Fixed to the ends of the yoke 48 on the side opposite the inking rolls are arms 49ª and 50ª (Figs. 3 and 7) supporting a brush 50ᵇ the bristles of which extend into the path of rotation of the type forms so as to lightly brush the printing surfaces of the latter as the type carrier is revolved. The brush bristles serve to spread the ink evenly over the surfaces of the type, carrying it into the bottoms of the grooves in the latter, and they also serve to remove from the type any foreign substance, as lint, which may adhere thereto.

Figures 5, 12, 13, 14:
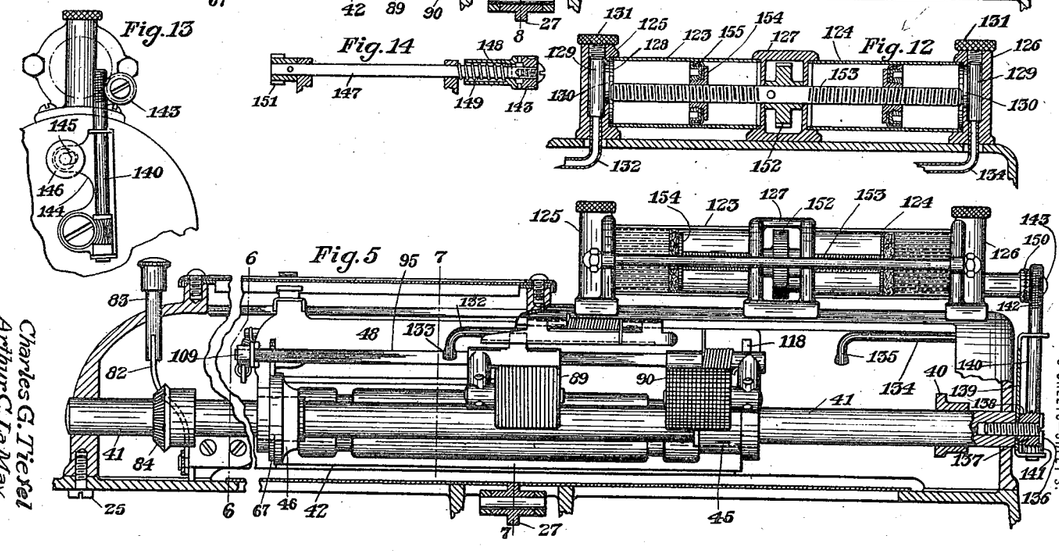
Fig. 5 is a similar view, showing the inking rolls in another position.
Fig. 12 is a central longitudinal section in elevation of the ink container.
Fig. 13 is an end elevation showing the means for actuating the plungers of the ink container.
Fig. 14 is a detail view of a shaft for actuating the plungers of the ink container, showing the releasing clutch.

Mounted on top of the casing are two ink fountains, or containers, 123 and 124, each comprising a cylindrical glass tube supported at its ends in sockets provided in a pair of end standards 125 and 126 and a central standard 127. The sockets are provided with gaskets, indicated at 128, and the ends of the tubes are tightly fitted therein so as to make them air-tight and to make leakage impossible. Each of the end standards is provided with a central opening 129 which communicates with its respective ink container through a slot 130 extending to the top of the container or tube, and each container is also provided with a filling opening leading to the opening 129 and adapted to be tightly closed by a screw cap 131. The standard 125 is provided with a supply tube 132 communicating with the opening 130 and extending through the bottom of the standard into and along the casing to a position at the left of the platen as shown in Figs. 4 and 5. The end of the tube is provided with a downwardly turned supply device or delivery head 133 having at its bottom a flattened contact surface in such position that the roll 89 is adapted to wipe over its flat surface whenever the roll is moved under the end of the tube and is raised and rotated by contact with the type forms. The head 133 is provided at the center of its contact surface with a very small aperture through which the ink is forced, and the contact surface is not only adapted to retain numerous unit quantities of ink thus supplied until removed by the ink roll but also insures smooth engagement between the head and roll without unduly wearing the latter. Preferably, ink is supplied to the roll 89 while the roll 90 is in printing position, as illustrated in Fig. 4, and it will be noted that as the carrier is shifted for printing from different type forms of the group 44, the roll 89 is shifted relatively to the delivery head 133, so that the ink is supplied distributively at various points on the surface of the roll 89.

The standard 126 is provided with a similar supply tube 134 having its depending delivery head 135 preferably in position to ink the roll 90 whenever the carrier is moved to print from the type forms "2" to "7", inclusive, which are the forms most frequently employed, and the ink is distributed over the surface of this roll due to its movement relative to the delivery head, as in the case of roll 89.

Fixed to the end of shaft 41, by means of a screw 136, is a part 137 provided with a shoulder 138 between which and the end of shaft 41 is formed a bearing for a bracket member 139, in flanges on the upper and lower ends of which is journaled a shaft 140 provided at its lower end with a worm wheel 141 meshing with a worm on the part 137. The bracket 139 is adapted to be turned about its bearing on the part 137, to bring a worm 142 at its upper end into and out of engagement with a worm wheel 143 rotatably journaled on a horizontal shaft 147 supported in bearings on the standards 126 and 127. The bracket 139 has a lug 144 provided with a slot 145 loosely engaging a screw 146 threaded into the casing for the purpose of securing the shaft 140 in adjusted position, and the purpose of this disconnecting feature of the shaft will appear later.

The gear wheel 143 is provided with teeth adapted to engage with teeth on a sleeve 148 splined to the shaft 147 and urged by a spring 149 toward the gear 143 so as to maintain the coöperating teeth of the two members in engagement as indicated at 150 in Fig. 5. It will be apparent, however, that if an obstruction be interposed to the rotation of shaft 147, as when the ink is exhausted and the plunger reaches the end of its travel, the teeth will slip over one another, thus forming a yielding connection for driving the shaft 147, and serving also as an audible alarm to indicate the condition of the mechanism. Shaft 147 has fixed to its inner end a pinion 151 meshing with a gear 152, which is located between the two walls of standard 127, and is pinned to a shaft 153 journaled in the walls of this standard. Shaft 153 extends centrally through each of the ink containers and preferably is provided in one with a right-hand thread, and with a left-hand thread in the other.

Threaded on each half of shaft 153 is, preferably, a plunger disk 154 on the hub of which is carried a cupped packing member 155 clamped against the disk 154 by a flanged retaining member 154$^a$, and backed by a nut 154$^b$. Packing member 155 is of leather, rubber, or other flexible material, and its rim, turning toward the pressure side of the plunger, is provided with a tapered edge, 155$^a$, of increased flexibility, which is forced by the advance of the plunger, and the pressure encountered, tightly against the walls of the container, following any irregularities existing in the latter. In order to hold the packing member more tightly against the container walls, a spring 155$^b$ may be provided within the rim of the member, and the spring retained in place by a flange on the retaining member 154$^a$. This provides a very efficient plunger which prevents the escape of air or liquid past it in the tube, cleaning the ink from the tube as it advances, so that the amount of ink in the container may at all times be seen. While the plunger is too flexible to fracture the glass of the tube, as might a solid one, yet it affords sufficient friction with the glass to prevent its turning during the rotation of the shaft 153, and thus obviates the necessity of any special construction for this purpose. The use of right and left-hand threads on the shaft 153 for driving the plungers in opposite directions serves to balance the thrust on the shaft so that no thrust bearings for the latter are necessary.

By moving the shaft 140 out of mesh with the gear 143, through the mechanism already described, shaft 153 may be rotated by hand in the proper direction to quickly retract the plungers to the ends of their respective containers adjacent the standard 127. In this relation of the parts the containers are filled with ink through the filling openings, ink of the proper color being placed in each cylinder and the filling openings being then tightly closed by the screw caps. Shaft 140 is then moved to mesh with gear 143 and is secured in this position by means of the screw 146.

The operation of the machine, through the actuating gearing previously described for connecting the shaft 153 with the type carrier shaft, automatically rotates the shaft 153 and so moves the plungers outwardly in the cylinders. It is to be noted with respect to this gearing that it produces by successive steps a great reduction of motion, the shaft 153 revolving once, for instance, in approximately 1600 revolutions of the carrier shaft, so that the ratio of initial to final motion of this gearing is very high. At each printing rotation of the carrier shaft the plungers are given a very minute movement outwardly in their respective cylinders, forcing from each cylinder through its supply tube a very small increment of ink which is precisely controlled in quantity by the predetermined amplitude of movement of the plunger, so as to be substantially commensurate with the average amount of ink used up by each printing operation. The pressure of air outside the delivery orifice permits the escape of only that quantity of ink which is positively displaced by the plunger.

Although the inking rolls are not brought into contact with their respective delivery heads at every printing operation, so as to collect the ink which is fed to the heads at every such operation, the flat surfaces of these heads 133 and 135 are adapted to retain the ink until the respective roll is actuated to position to remove it therefrom, and the rolls, being made of very absorbent material, are adapted to immediately absorb and become impregnated with the ink. These delivery heads thus serve as intermediate storage devices between the ink supply fountains and the inking rolls.

As the plungers 154 fit tightly within the tubes, and the containers are closely sealed and made air-tight, except for the opening through the distributing heads, there is no tendency for the ink to flow through the small apertures in these heads, no matter how long the apparatus is allowed to stand. Furthermore, as the supply of ink is positively controlled by pressure, there is no clogging of the supplying means, and the quantity of ink supplied is absolutely controlled and is uniform, regardless of the changing conditions of the ink. The apparatus operates equally well whether the machine be supported on a horizontal or on an inclined base, and, in fact, the apparatus may be turned at any angle, or inverted, without leakage of ink.

Having thus decribed our invention, what we claim as new, and desire to secure by Letters Patent is:—

1. In a printing apparatus, the combination of a casing; a rotary type carrier therein; a platen, said carrier and platen having a relative printing movement; inking means for the types adapted to contact therewith during the rotation of the carrier; a fountain container supported by said casing and adapted to apply ink to said inking means; a plunger for said container; and means actuated by said relative printing movement of the carrier and platen for effecting a relative movement between said container and plunger and forcing ink from the container.

2. In a printing apparatus, the combination of a casing; a rotary type carrier therein; inking means for contact with the type to apply ink thereto; a fountain ink container supported by said casing and adapted to apply ink to said inking means; a plunger for said container; and means actuated by the rotary movement of the carrier for effecting a relative movement of said container and plunger and forcing ink from said container.

3. In a printing apparatus, the combination of a rotary type carrier; a fountain ink container; inking means for applying ink to the types, said inking means being movable by the rotation of said carrier to position to receive ink from said container; a plunger for said container; and means actuated by the rotation of said carrier for effecting a relative movement of said container and plunger and forcing ink from said container.

4. The combination in a portable hand stamp of a casing; a settable type carrier therein; a platen for coöperation with the carrier, said carrier and platen having a relative printing movement; inking means adapted for inking contact with the type; a fountain ink container supported by said casing and having a delivery tube leading to said inking means; a plunger for controlling the supply of ink from said container; and a motion reducing connection actuated by said relative printing movement of the carrier and platen for effecting a relative movement of said container and plunger and forcing ink through said tube to said inking means.

5. In a printing apparatus, a casing, a type carrier therein provided with individual types printing in inks of different colors, said carrier being settable to bring said types selectively to printing position; a platen, said carrier and platen having a relative printing movement; a plurality of inking means for applying the proper inks to said types; a plurality of fountain ink containers supported by said casing, one for ink of each color; a plunger for each container; and means actuated automatically by said relative printing movement of the carrier and platen for effecting a relative movement of each container and its plunger to supply ink to the corresponding inking means.

6. In a printing apparatus, the combination of a type carrier movable to bring a plurality of types, selectively, to printing position; a platen, said carrier and platen having a relative printing movement; a plurality of inking means for applying ink to different portions of the types, said inking means being movable by said selective movement of the carrier to bring the proper one of said means to position to ink the selected type; a plurality of fountain ink containers, one for each of said inking means; a plunger for each of said containers; and means actuated automatically by said relative printing movement of the carrier and platen for effecting a relative movement of each container and its plunger to supply ink to the corresponding inking means.

7. In a check protecting machine, the combination with a printing mechanism including a plurality of types movable, selectively, to printing position, and a platen, and a main operating mechanism therefor; of an inking device for inking said types and movable by the selective movement of the latter; an ink supply fountain for said inking device; a device between the ink fountain and said inking device for retaining the ink pending subsequent deposit upon said inking device, said inking device being brought by said selective movement of the types to position to collect the ink from said ink retaining device; and means connected with said operating mechanism for automatically forcing ink from said fountain to said ink retaining device upon actuation of said operating mechanism.

8. In a check protecting machine, the combination with a printing mechanism including a plurality of types and a platen, and a main operating mechanism therefor; of a plurality of inking devices for inking said types; an ink supply fountain for each inking device; a device between each fountain and its corresponding inking device for retaining the ink pending subsequent deposit upon said inking device; means for bringing the inking devices, selectively, into coöperation with their respective ink retaining devices for collecting the ink therefrom; and means connected with said operating mechanism for automatically forcing ink from said fountains to their respective ink retaining devices upon actuation of said operating mechanism.

9. In a check protecting machine, the combination with a printing mechanism including a plurality of types and a platen, and a main operating mechanism therefor; of a plurality of inking devices for inking said types; a plurality of corresponding ink containers; a plunger in each container; a shaft extending into each container and having opposed threaded connections with said plungers for balancing the torque on said shaft; and a motion reducing gearing connected to said operating mechanism and to said shaft for slowly turning the latter automatically to simultaneously advance said plungers in their respective containers and force therefrom to the respective inking devices small increments of ink upon actuation of said operating mechanism.

10. In a check protecting machine, the combination with a printing mechanism including a plurality of types and a platen, and a main operating mechanism therefor; of an inking device for inking said types; an ink supply fountain for said inking device, including an ink container and a plunger movable in the latter to force ink therefrom to said inking device; and a high-ratio motion reducing gearing connected to said operating mechanism and having a yieldable connection with said plunger for permitting said gearing to continue to move without moving said plunger when the latter reaches the limit of its travel.

11. In a check protecting machine, the combination with a casing; a type carrier in said casing movable to bring various type forms, selectively, to printing position; and a platen, said carrier and platen being normally spaced apart and having a relative printing movement; of an inking device for said type forms; a fountain ink container supported by the casing and having a passage leading to said inking device; a plunger in said container; and a high-ratio motion reducing gearing supported by said casing and connected to said plunger and actuated by said printing movement of the carrier and platen, for imparting a slight movement to said plunger and forcing from said container to said inking device a very small increment of ink.

CHARLES G. TIEFEL.
ARTHUR C. LA MAY.

Witnesses:
MAGNUS H. JOHANSON,
JOHN J. CHAPIN.